Nov. 20, 1951

L. A. MEACHAM 2,576,026

ELECTRONIC SWITCH

Filed June 28, 1950

INVENTOR
L. A. MEACHAM
BY H. A. Burgess
ATTORNEY

Patented Nov. 20, 1951 2,576,026

UNITED STATES PATENT OFFICE 2,576,026

ELECTRONIC SWITCH

Larned A. Meacham, New Providence, N. J., assignor to Bell Telephone Laboratories, Incorporated, New York, N. Y., a corporation of New York Application June 28, 1950, Serial No. 170,726

3 Claims. (Cl. 171—97)

This invention relates to circuits employing asymmetrically conducting devices which transfer electrical energy under control of currents which are applied to said asymmetric devices.

Circuits of this type have been disclosed in Patent No. 2,535,303 to W. D. Lewis, dated December 26, 1950, wherein they have been denominated switches or, alternatively, gates and it is a general object of this invention to improve the switches therein disclosed. More specifically it is an object of the invention to increase the signal amplitude which may be handled by such switches. Also, it is an object of the invention to increase the signal amplitude which may be handled without increasing the gating voltage. A feature of the invention is an increase in the signal amplitude which may be handled by a switch of the Lewis type in addition to a decrease in the peak gating voltage required.

The basic electronic switch disclosed in the Lewis application comprises a T-network of asymmetrically conducting devices having like electrodes connected to the junction point. Such a switch displays high attenuation to input energy when a control voltage of one polarity is applied in series with the shunt device and low attenuation when the control voltage is of the opposite polarity. To avoid clipping or limiting, the signal amplitude that can be handled is considerably smaller than the zero-to-peak amplitude of the gating voltage, since the current must not be allowed to reverse in either of the series devices. In accordance with an embodiment of the present invention which will be later described in detail, the signal amplitude which may be handled by a switch of this type is considerably increased by applying a constant bias to the common junction of the asymmetrically conducting devices.

In the present specification and appended claims, the term "asymmetrically conducting device" refers to any of the well-known devices which present a relatively low impedance to applied voltages of one polarity and a relatively high impedance to voltages of the opposite polarity so that they permit substantial conduction in but one direction therethrough. Examples of such devices are vacuum tube diodes and germanium crystal rectifiers. As it is well known that such devices have non-ohmic impedance characteristics, they will not be described in detail herein.

The invention may be better understood from a consideration of the following detailed description when read in accordance with the attached drawing, in which.

Figure 1:
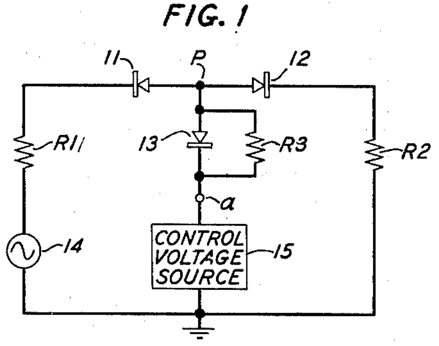
Fig. 1 shows schematically a prior art electronic switch as disclosed in the aforementioned Lewis application.

Referring now to Fig. 1, a simple switch in accordance with the aforementioned Lewis application comprises a T configuration of three asymmetrically conducting devices 11, 12, and 13 having like electrodes connected to the junction point P. These devices are adapted to control the flow of energy from a source such as the generator 14 having an effective internal resistance $R_1$ to a load resistor $R_2$. This control is effected by a voltage source 15 which applies biasing voltages of either polarity in series with the shunt or control device 13. This bias voltage is applied to the electrode of the shunt device 13 other than the one connected to the junction point P.

If the control voltage applied to the network of Fig. 1 is negative, that is, if the source 15 makes the point $a$ negative with respect to ground, the switch will produce a large attenuation in power flowing from generator 14 to the load resistor $R_2$. This will be evident by considering the effective resistances of the asymmetric devices in the network when a voltage of this polarity is applied. The direction of the arrowhead in the symbols which represent the asymmetric devices 11, 12, and 13 indicates the low resistance direction of positive current flow. That is, a positive current flowing through such a device in the direction of the arrow-like symbol experiences a relatively low resistance, and the positive current flow will be little affected by the device. Such a current is said to be a forward current and biases the device in its low resistance or passing direction. Current flow in the opposite direction will experience a relatively high resistance so that there will be little current flow in this direction. Such a current is said to be a backward current and biases the device in its high resistance or blocking direction. Therefore, when point $a$ is negative, current will flow through the control device 13, which is shunted by a resistor $R_3$, in the forward direction, and will give the parallel combination of $R_3$ and the device 13 a relatively low resistance. This same current divides between the branch containing the device 11 in series with the generator 14 and resistor $R_1$ and the branch containing the device 12 and the load resistor $R_2$ and flows through devices 11 and 12 in the backward direction, giving devices 11 and 12 a relatively high resistance. In this condition, the network of Fig. 1 is a T pad with a low shunt-arm resistance and a high series-arm resistance, and, consequently, a pad which introduces high attenuation between generator 14 and load resistor $R_2$.

With a positive control voltage in the network of Fig. 1 so that point $a$ is positive with respect to ground, the device 13 is biased in its high resistance direction so that the shunt resistance of the T pad is substantially equal to the resistance $R_3$. Current flows through the series devices 11 and 12 in their low resistance direction so that the T pad now has low series-arm resistance and high shunt-arm resistance, and attenuation between the generator 14 and load $R_2$ will be small. The resistor $R_3$ is added in parallel with the device 13 to supplement the low backward current which would flow through device 13 alone when the control voltage is positive so that sufficient bias is applied to the series devices 11 and 12. If the resistor $R_3$ is made too small, attenuation is increased because of the increased shunt load. If, however, the resistor $R_3$ is made too large, attenuation is increased because the forward current through the series devices 11 and 12 will be too small, and their resistances will consequently be too large. Minimum attenuation will therefore be found for some optimum value of resistance $R_3$.

Figure 2:
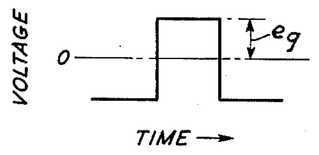
Fig. 2 illustrates a gating pulse adapted to close the switch shown in Fig. 1.

From the above discussion, it may be seen that the proper gating voltage to close the switch shown in Fig. 1 is a positive pulse rising from a negative base, as is illustrated in Fig. 2. With germanium crystal rectifiers as devices 11, 12, and 13 and with resistors $R_1$ and $R_2$ each equal to 1500 ohms and with $R_3$ equal to 5500 ohms, differences as great as 110 decibels have been measured between the attenuation when the switch is conducting and when the switch is not conducting. The switch, however, does have certain limitations since the signal amplitude that can be handled by the switch is appreciably smaller than the zero-to-peak amplitude $e_g$ of the gating voltage. This results from the fact that the current must not be allowed to reverse in either of the devices 11 and 12 while the switch is conducting to avoid limiting or clipping of the input voltage. As the devices 11, 12, and 13 are assumed to have characteristics such that they may be regarded as either open or short circuits, for backward and forward currents, respectively, it may be shown that the input voltage $e$ supplied by generator 14 must be kept within the following range to avoid clipping or limiting;

$$-\frac{R_1}{R_3}e_g<e<\frac{R_2}{R_2+R_3}e_g \qquad (1)$$

With the circuit values given above and with a gating pulse having a zero-to-peak voltage of five volts, the above equation will show that the input voltage $e$ must be limited to approximately $\pm 1$ volt to avoid clipping.

Figure 3:
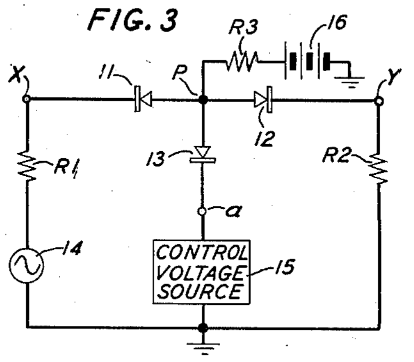
Figs. 3, 4 and 5 show schematically electronic switching arrangements embodying the principles of the present invention.

Restrictions on the input amplitude may be avoided in accordance with the present invention by the circuit shown in Fig. 3. In this circuit, the bias current for the asymmetric devices depends primarily upon the direct-current voltage supply 16 which is applied to the junction point P through resistor $R_3$, and is relatively independent of the height of the gating pulses if the backward resistance of the device 13 is large compared to the resistors $R_1$ and $R_2$. When any one of the asymmetric devices is biased in its low resistance direction, its resistance is generally lower than it would be under corresponding conditions in Fig. 1, since the forward current can be made larger without using either an excessively small value of $R_3$ or excessively large pulses. Thus, the change of attenuation afforded by the gating circuit tends to be enhanced. With the circuit shown in Fig. 3 the input amplitude is increased to approach new limits.

$$-\frac{R_1}{R_3}E_{bb}<e<\frac{R_2}{R_2+R_3}E_{bb} \qquad (2)$$

where $E_{bb}$ is the voltage of battery 16 and provided that the gate pulses swing through at least the same voltage range as the input voltage $e$, preferably extending somewhat above and below it, as will be explained later. By way of comparison, if the resistors $R_1$ and $R_2$ are each equal to 1500 ohms and if the bias supply $E_{bb}$ equals 150 volts and if resistor $R_3$ is equal to 75,000 ohms, the above equation will show that the voltage $e$ may vary within the limits of approximately $\pm 3$ volts.

As previously indicated, it is only necessary that the gating voltage swing through a voltage range of just greater than $\pm 3$ to avoid clipping when the switch is on and to prevent the input energy from turning the switch on of its own accord when the switch is off. The range of voltage through which the gating voltage must swing to avoid clipping may be understood by considering Fig. 3 with $R_1$, $R_2$, $R_3$ and $E_{bb}$ having the values previously mentioned and with the source 14 varying over a range of $\pm 3$ volts. To avoid clipping the positive peaks of the input voltage, it is necessary that the device 11 remain conducting, i. e., in its low resistance condition. Assuming the asymmetric devices to have characteristics such that they realize a sharp transition from low to high impedance with a change from forward to backward currents flowing therethrough, the limiting condition will exist when points $x$ and P have the same above-ground potential. No current will then flow through the mesh containing device 11 so that points $x$ and P will be at the potential of the input voltage $e$ which, at its positive peak, will be plus three volts. With $R_3$ equal to 75,000 ohms, the current from battery 16 will be approximately two milliamperes so that point $y$ will also be at three volts above ground since substantially all of the current from battery 16 will flow through device 12 and $R_2$. It is therefore necessary only to keep device 13 in its high resistance condition which may be accomplished by keeping the potential of point $a$ always higher than the potential of point P which, as previously shown, will reach a peak of three volts. On the peak negative swings of the input voltage, points $x$, $y$, and P will be at approximately ground potential so that there will be no clipping of the negative peaks if point $a$ remains above the aforementioned three volts.

It is also necessary to prevent the input signal from turning the switch on when the gating voltage is negative. It may be seen that this limiting condition will occur on the negative peaks of the input voltage which tend most to bias device 11 in its low resistance condition. Since device 11 will switch to its high resistance direction only if point $x$ becomes more negative than point P, it is necessary only to keep point P more negative than the peak negative potential of point $x$, or more negative than minus three volts. Thus the gating voltage shown in Fig. 2 for a switch as shown in Fig. 3 should rise from a base which is at least more negative than the negative peaks of the input voltage and should rise to a peak at least more positive than the peak positive input voltage.

It has thus been shown that by modifying the Lewis type switch in accordance with the present invention, the signal amplitude which may be handled has been increased and, in addition, it is possible to decrease the peak gating voltage required.

Figure 4:
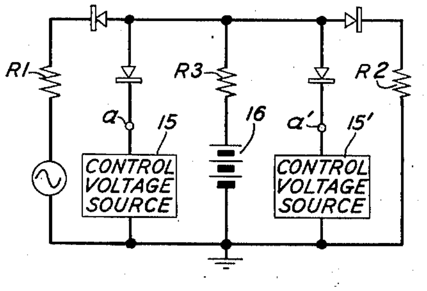

As in the case of the Lewis circuit, two or more asymmetric devices energized by separate control voltages may be used as the shunt arm of the T network as is illustrated in Fig. 4, in which case low attenuation will be realized only when all of the control voltages are simultaneously positive. Further, the battery supply 16 and all of the asymmetric devices may be reversed in polarity to permit the use of gating pulses of the opposite sign.

Figure 5:
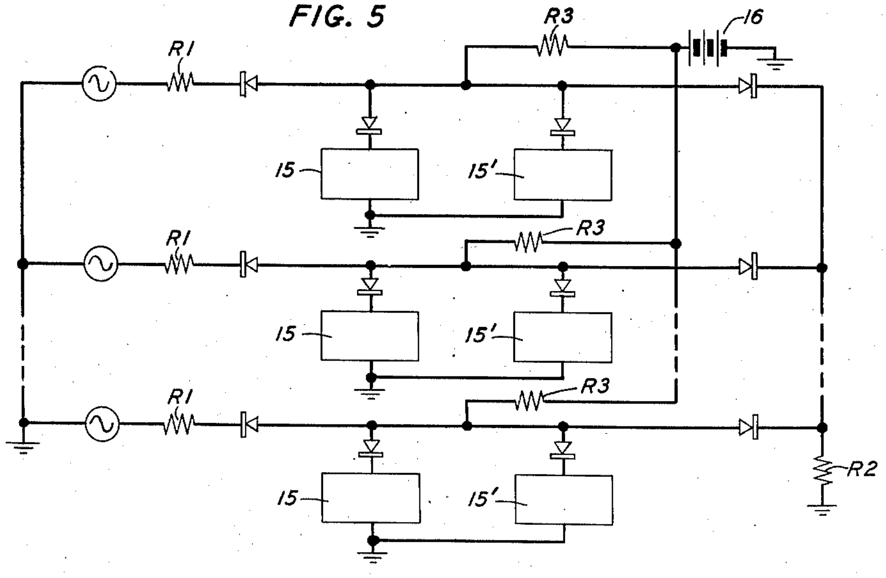

Fig. 5 shows a plurality of switches or gates which, individually, are as shown in Fig. 4, operating into a common load resistor $R_2$. This is a basic arrangement which is useful in the sampling of a plurality of energy sources, for example, speech channels for time division multiplex systems. In such applications, one of the usual requirements is that when all the signal input voltages are zero, the output voltage across $R_2$ must be accurately constant. This is particularly important in connection with the effective application of instantaneous companding to the multiplex signal. The fact that the bias currents of the several gates depend almost exclusively upon the battery supply 16 which is common to all of the gates and upon the values of resistors $R_1$, $R_2$, and $R_3$, of which $R_2$ is also common, greatly facilitates meeting this requirement.

Although the invention has been described in connection with specific embodiments, other modifications and embodiments will readily occur to one skilled in the art without departing from the spirit of the invention.

What is claimed is:

1. A switching network which comprises a plurality exceeding three of asymmetrically conducting devices each having an electrode connected to a junction point, said devices having like electrodes connected to said junction, an input connected to one of said devices, an output connected to another of said devices, control means connected to the remainder of said devices, and a source of direct current connected to said junction.

2. The further combination in accordance with claim 1 of a resistor in series with said source of direct current.

3. An electronic switch having having an input circuit and an output circuit and comprising a pair of asymmetrically conducting devices connected in series between said input and said output, a plurality of asymmetrical devices each having one electrode connected to said first two devices at the junction thereof, said asymmetric devices having like electrodes connected to the said junction, a source of direct current, means connecting said source to said junction, and means to vary the attenuation between said input and said output which comprises a source of voltage connected to each of said plurality of asymmetric devices.

LARNED A. MEACHAM.

No references cited.